United States Patent
Yang et al.

(10) Patent No.: US 10,615,990 B2
(45) Date of Patent: Apr. 7, 2020

(54) ROBUST EVENT HANDLING IN AN ELECTRONIC SUBSCRIBER IDENTITY MODULE (ESIM) NOTIFICATION SERVICE

(71) Applicant: Apple Inc., Cupertino, CA (US)

(72) Inventors: Xiangying Yang, Cupertino, CA (US); Li Li, Los Altos, CA (US); Avinash Narasimhan, Cupertino, CA (US); Jean-Marc Padova, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 134 days.

(21) Appl. No.: 15/602,036

(22) Filed: May 22, 2017

(65) Prior Publication Data

US 2017/0338944 A1    Nov. 23, 2017

Related U.S. Application Data

(60) Provisional application No. 62/340,386, filed on May 23, 2016.

(51) Int. Cl.
| | |
|---|---|
| *H04L 9/32* | (2006.01) |
| *H04W 4/70* | (2018.01) |
| *H04W 12/00* | (2009.01) |
| *H04W 12/04* | (2009.01) |

(52) U.S. Cl.
CPC .......... *H04L 9/3297* (2013.01); *H04L 9/3239* (2013.01); *H04W 4/70* (2018.02); *H04W 12/0023* (2019.01); *H04W 12/00514* (2019.01); *H04W 12/04* (2013.01)

(58) Field of Classification Search
CPC .......... H04W 4/70; H04W 4/60; H04L 63/10; H04L 63/12
See application file for complete search history.

(56) References Cited

U.S. PATENT DOCUMENTS

| | | | | |
|---|---|---|---|---|
| 2012/0190354 | A1* | 7/2012 | Merrien | H04W 4/70 455/422.1 |
| 2012/0260090 | A1* | 10/2012 | Hauck | H04L 63/0853 713/168 |
| 2012/0331292 | A1* | 12/2012 | Haggerty | H04L 63/0272 713/168 |

OTHER PUBLICATIONS

GSM Association, Official Document SGP.21—RSP Architecture, Version 1.0, Dec. 23, 2015, 52 pages.

(Continued)

*Primary Examiner* — Ellen Tran
(74) *Attorney, Agent, or Firm* — Dickinson Wright RLLP

(57) ABSTRACT

Duplicate processing of events registered at a root server is avoided. An electronic subscriber identity module (eSIM) server pushes, to a root server, data in the form of notification data portions indicating that commands or events need to be processed by a device. The device includes an embedded universal integrated circuit card (eUICC). The device pulls a notification list from the root server. The notification list includes one or more notification data portions. The device checks a given notification data portion to see if it represents a duplicate before communicating with the eSIM server to perform further processing related to the event. The device bases the check for duplication on an event history and/or on a hash value where the hash value is based on one or more eSIMs installed in the eUICC. The device is able to prioritize notification data portions before processing them.

20 Claims, 10 Drawing Sheets

(56) References Cited

OTHER PUBLICATIONS

GSM Association, Official Document SGP.22—RSP Technical Specification,, Version 1.0, Jan. 13, 2016, 114 pages.

* cited by examiner

-- PRIOR ART --

-- PRIOR ART --

ROBUST EVENT HANDLING IN AN ELECTRONIC SUBSCRIBER IDENTITY MODULE (ESIM) NOTIFICATION SERVICE

CROSS-REFERENCE TO RELATED APPLICATION

This application claims benefit of U.S. Provisional Patent Application No. 62/340,386, entitled "ROBUST EVENT HANDLING IN AN ELECTRONIC SUBSCRIBER IDENTITY MODULE (eSIM) NOTIFICATION SERVICE," filed May 23, 2016, which is hereby incorporated by reference herein.

FIELD

The described embodiments relate to handling of electronic subscriber identity module (eSIM) notifications pulled by a wireless device from a root server.

BACKGROUND

Remote subscriber identity module (SIM) provisioning includes activities such as downloading, installing, enabling, disabling, switching and deleting of a profile on an embedded universal integrated circuit card (eUICC). An eUICC is a secure element for hosting profiles. A profile is a combination of operator data and applications provisioned on an eUICC in a device for the purposes of providing services by an operator. A profile can contain one or more secure data used to prove identity and thus verify contract rights to services. Some remote provision aspects are handled through a discovery server. A device may attempt to perform unnecessary profile operations, e.g., duplicate profile operations, if notifications on the discovery server are not up-to-date.

A profile can be identified by a unique number called an ICCID (Integrated Circuit Card Identifier). Profile management can include a combination of local and remote management operations such as enable profile, disable profile, delete profile, and query profiles present on an eUICC. An operator is a company providing wireless cellular network services. A mobile network operator (MNO) is an entity providing access capability and communication services to its subscribers through a mobile network infrastructure. In some cases, the device is user equipment used in conjunction with an eUICC to connect to a mobile network. In a machine-to-machine (M2M) environment, a device may not be associated with a user and may have no user interface. An end user is a person using a (consumer or enterprise) device. An enabled profile can include files and/or applications which are selectable over an eUICC-device interface.

A function which provides profile packages is known as a subscription manager data preparation (SM-DP, or SM-DP+), also known as an eSIM server. An SM-DP may also be referred to as a profile provider or as an eSIM vendor. An eSIM is an electronic SIM. An eSIM is an example of a profile. A profile package can be a personalized profile using an interoperable description format that is transmitted to an eUICC as the basis for loading and installing a profile. Profile data which is unique to a subscriber, e.g., a phone number or an International Mobile Subscriber Identity (IMSI), are examples of personalization data. The SM-DP communicates over an interface with an eUICC. Certificates used for authentication and confidentiality purposes can be generated by a trusted certificate issuer.

An architecture framework related to remote provisioning and management of eUICCs in devices is outlined in GSM Association document GSMA SGP.21: "RSP Architecture," Version 1.0 Dec. 23, 2015 (hereinafter "SGP.21"). A related document provided by the GSM Association is SGP.22 "RSP Technical Specification," Version 1.0, Jan. 13, 2016 (hereinafter "SGP.22").

A device may pull a notification of an event from a root server where the event is pushed to the root server by an SM-DP+ server. FIG. 1 illustrates SM-DP+ servers 140 and 150 in communication over interfaces 141 and 151, respectively, with a subscription manager discovery service (SMDS) server or root server 130. Further information on SM-DP+ servers can be found in SGP.22. The root server 130 is in communication with a device 110 over an interface 131. The device 110 includes an eUICC 102 associated with an identifier EID 103. In the operation of this system, the SM-DP+ server 140 may push data, represented as a message 149 over the interface 141. The data can include an address of the SM-DP+ server 140. The address is represented in FIG. 1 as @SM-DP+ server 140. The device 110 can pull a notification list. The pull operation is represented by the message 119 in FIG. 1. FIG. 2 illustrates a message flow that can occur on the system of FIG. 1. Based on an action 10, the SM-DP+ server 140 can send notification data to the root server 130 in the message 149. The device 110, based on an action 20, can pull a notification list from root server 130. The pull sequence is represented by messages 202 and 203. The device 110 then reads a notification from the notification list and downloads an event. The request for the event and the download of the event are indicated as messages 204 and 205. The device 110, along with the eUICC 102, can then process the event as indicated by process command 30. After successful completion of the event, the device 110 can send a receipt to the eSIM server 140 as indicated by the message 206. The SM-DP+ server 140 can then delete the corresponding event using the message 207, which triggers the update 40 item at the root server 130. At any time, the device 110 may again pull and download as indicated by pull and download 50. After the latter download, the device 110 and the eUICC 102 may process the event as indicated by process event 60 in FIG. 2.

An eUICC includes an operating system, and the operating system can include ability to provide authentication algorithms to network access applications associated with a given operator. The operating system also can include the ability to translate profile package data into an installed profile using a specific internal format of the eUICC. An ISD-P (issuer security domain—profile) can host a unique profile within an eUICC. The ISD-P is a secure container or security domain for the hosting of the profile. The ISD-P is used for profile download and installation based on a received bound profile package. A bound profile package is a profile package which has been encrypted for a target eUICC. An ECASD (embedded UICC controlling authority security domain) provides secure storage of credentials required to support the security domains on an eUICC. A controlling authority security domain (CASD) may also be referred to as a "key store" herein. A security domain within the eUICC contains the operator's over the air (OTA) keys and provides a secure OTA channel. OTA keys are credentials used by an operator for remote management of operator profiles on an eUICC.

SUMMARY

Representative embodiments set forth herein disclose various systems and techniques for recognizing when an event notification pulled from a root server is stale, that is, the event has already been processed.

An eSIM server connects to a device including an eUICC and the eSIM server has a connection to a root server, for example, a subscription manager discovery service (SMDS) server. The SMDS server is also reachable by the device. The eSIM server pushes a notification with an address of the eSIM server and an address of the eUICC. The device pulls from the SMDS server or root server the notification. A problem arises if the device has already processed the notification. However, this condition can be difficult to recognize because the party responsible for the data in the eSIM server, for example a wireless operator, may not wish to send particular command information to the SMDS server. Thus, the notification may be of a minimal nature such that a duplicate event represented on the SMDS server is difficult to distinguish from a new event originating from the same eSIM server. In this sense, an SMDS server is neutral because they are not aware of the underlying commands from the eSIM server that are represented by a given notification. Processing of a duplicate event wastes device and eUICC resources and adds unnecessary signaling on the involved network interfaces (such as an event or command retrieval from an eSIM server). Embodiments presented herein reduce or avoid these resource waste and unnecessary signaling burdens.

In normal operation, a notification is deleted by the eSIM server from the SMDS server after successful processing by the device. However, network delay in deleting the notification from the SMDS server can be a factor in the device again pulling the same notification from the SMDS server after a successful processing of the underlying event. In the worst case, the device can repeatedly retrieve the same notification and process it.

In embodiments presented herein, devices have the ability to prioritize notifications when the corresponding event or command type information is available in the notification.

A device can reduce the re-processing problem described above by checking whether the notification has previously been processed. For example, if the command type and target eSIM is known, such as the pair ("install eSIM", "ICCID"), the device can check whether the eSIM with identity value ICCID is already installed in the eUICC.

If the command type and/or target eSIM are not known, then the device can determine a match between a current notification and a previously processed notification by using an event identifier approach. This saves device resources and avoids unnecessary network signaling.

A hashed event content approach, in some embodiments, is based on the eSIM server attaching a hash value to each notification. Upon receiving a notification, for example, related to installing an eSIM with identifier ICCID A, the device checks whether any already-installed eSIM will generate a matching hash value. For example, if the notification includes the information that the event type is "install", the device or eUICC, can compute a hash based on a hash argument for an already-installed eSIM with identifier ICCID B. The hash argument will include a number or string representing the install command and a number or string representing ICCID B; this will create a second hash value. If the second hash value matches the hash value in the notification, then the notification can be skipped.

In some embodiments, the event history table is stored in an eUICC memory. This reduces the risk of losing the state of the event history table if the device memory fails or crashes.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

System

Figure 1:
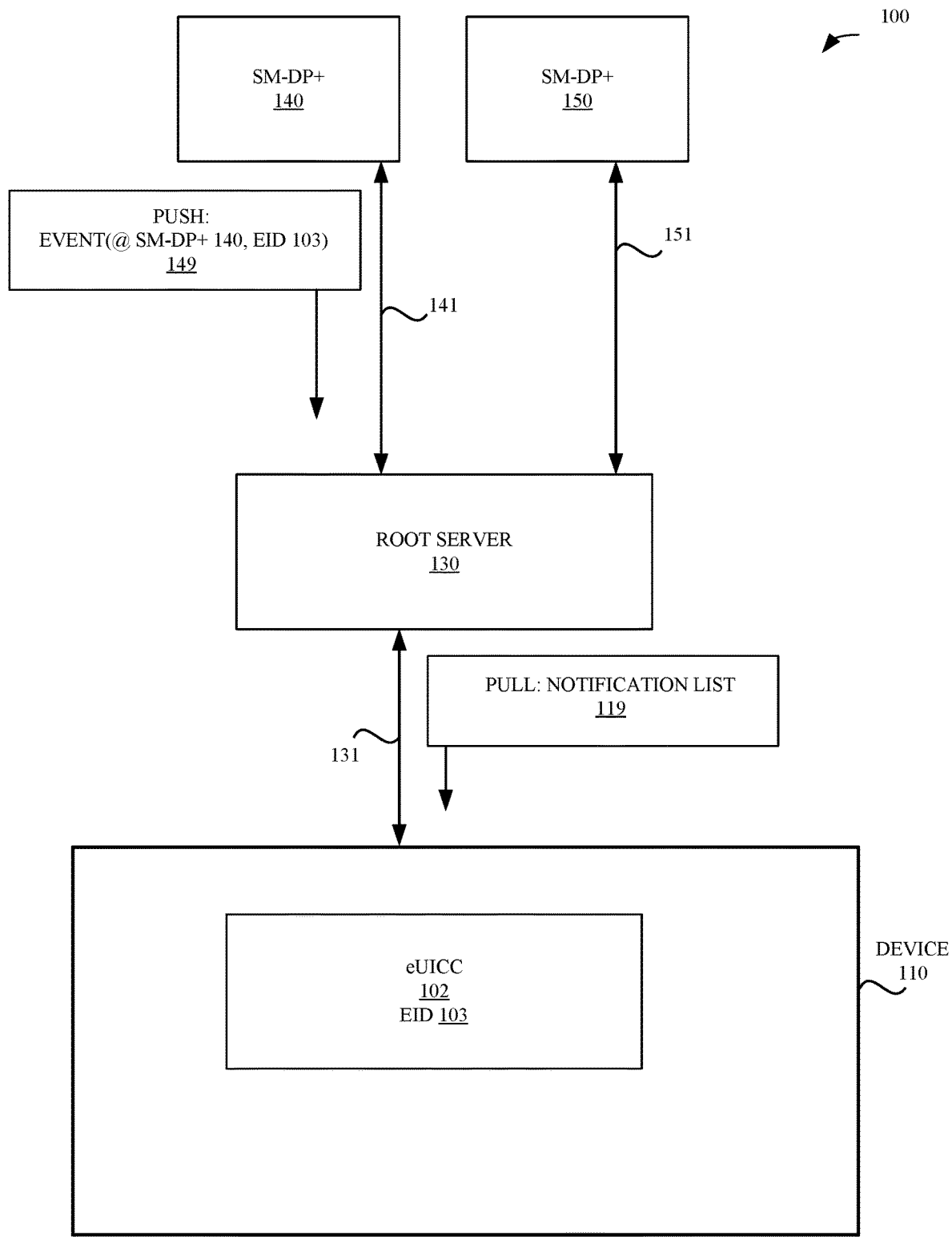
FIG. 1 illustrates a system including a root server.
Figure 2:
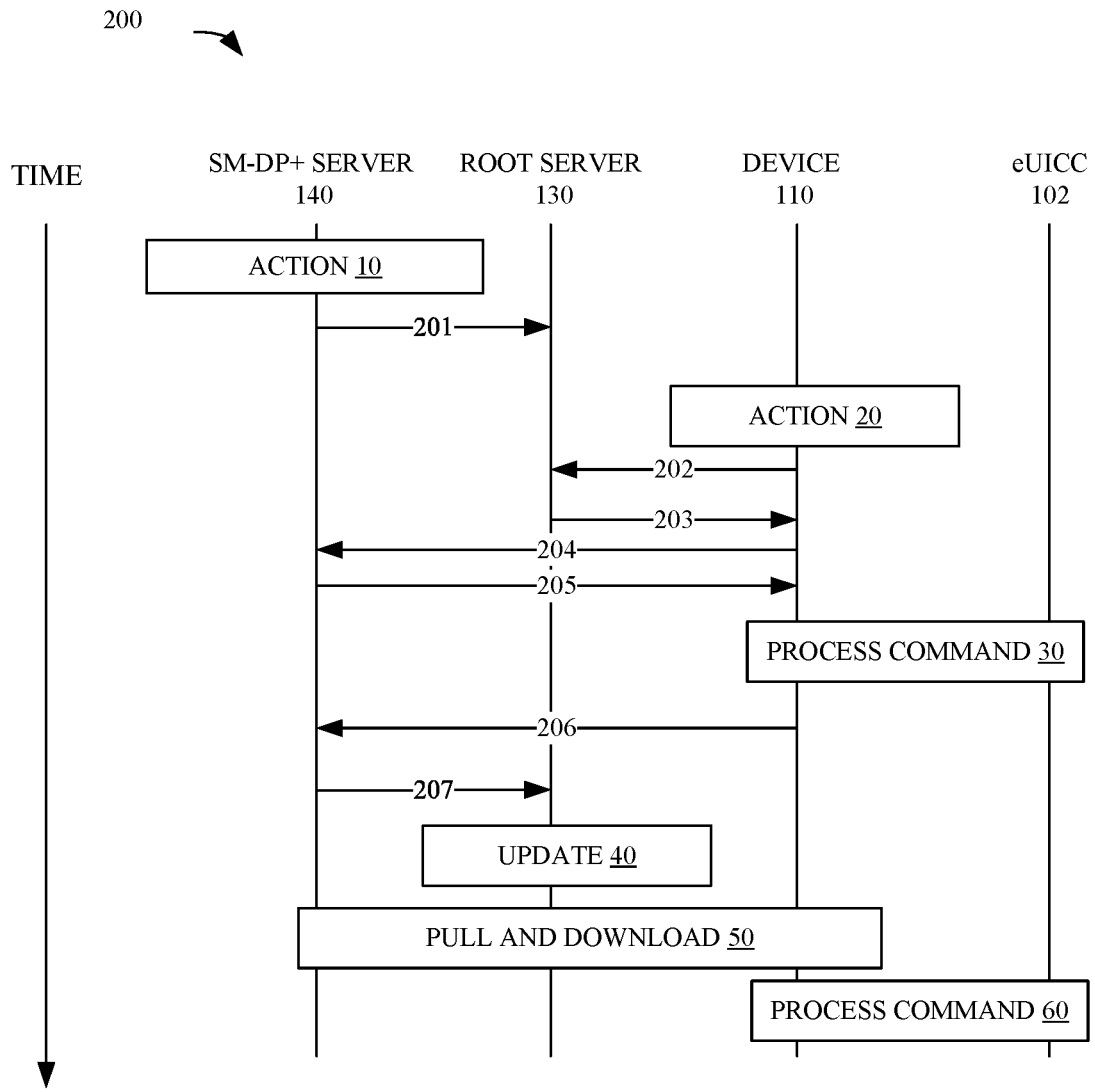
FIG. 2 illustrates message flows related to the root server of FIG. 1.
Figure 3:
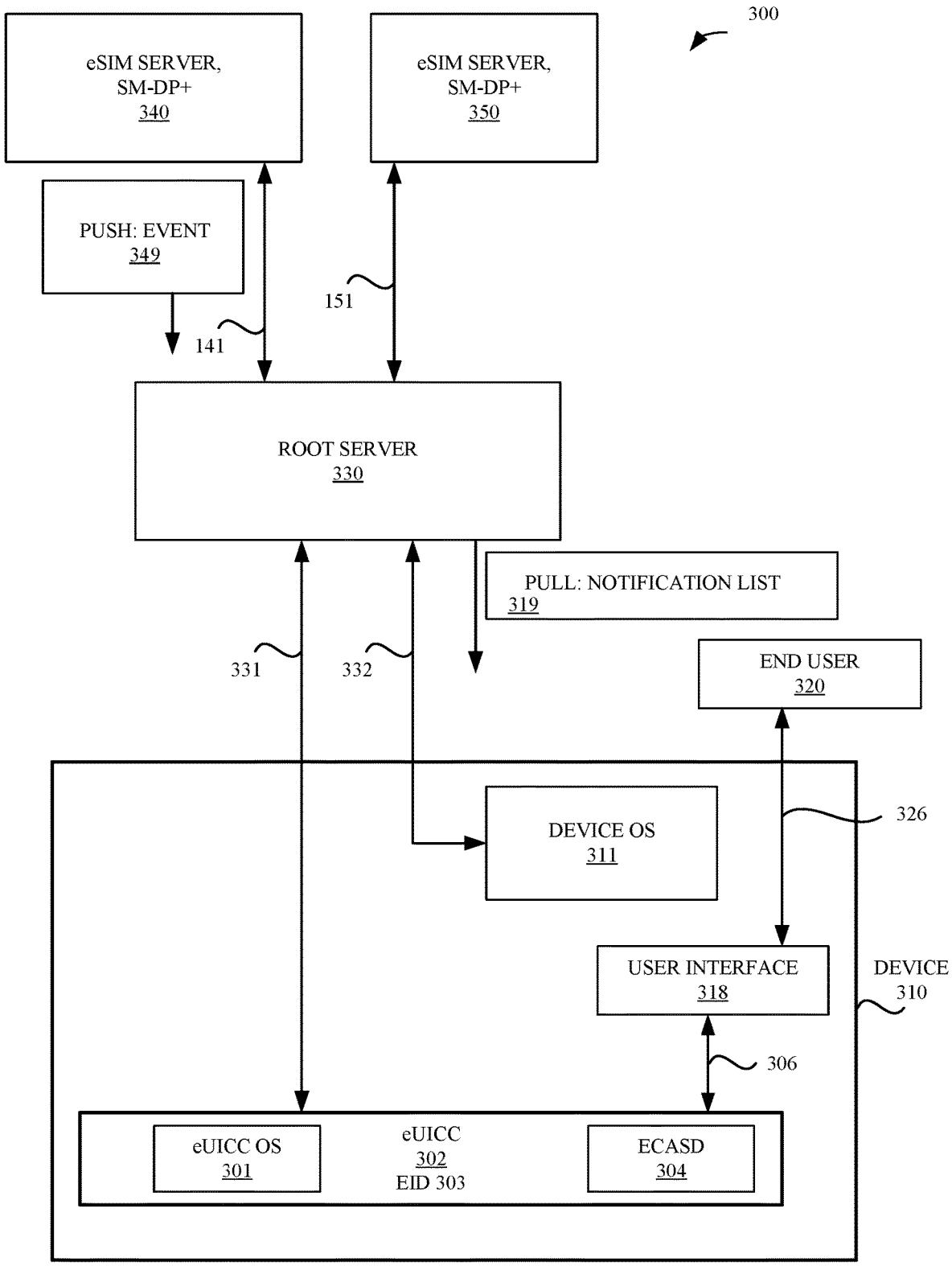
FIG. 3 illustrates an exemplary system including eSIM servers, a root server and a device comprising an eUICC, according to some embodiments.

FIG. 3 represents an exemplary system including eSIM servers 340 and 350 in communication with a root server 330 via interfaces 141 and 151. FIG. 3 also illustrates a device 310 including an eUICC 302. The device 310 may be operated by an end user 320. In some scenarios, the device 310 is deployed in a machine-to-machine system and may not include the user interface 318 nor be associated with the end user 320. A device OS 311 communicates with the root server 330 via an interface 332. An eUICC OS 301 communicates with the root server 330 over an interface 331 (via the device 310). The eUICC 302 is associated with an identifier EID 303. The eUICC 302 includes a key store ECASD 304. In FIG. 3, the eSIM server 340 is shown pushing an event message 349 to the root server 330. The device 310 is shown pulling a notification list from the root server 330 in a message 319.

Message Flow and Notification Checking

Figure 4:
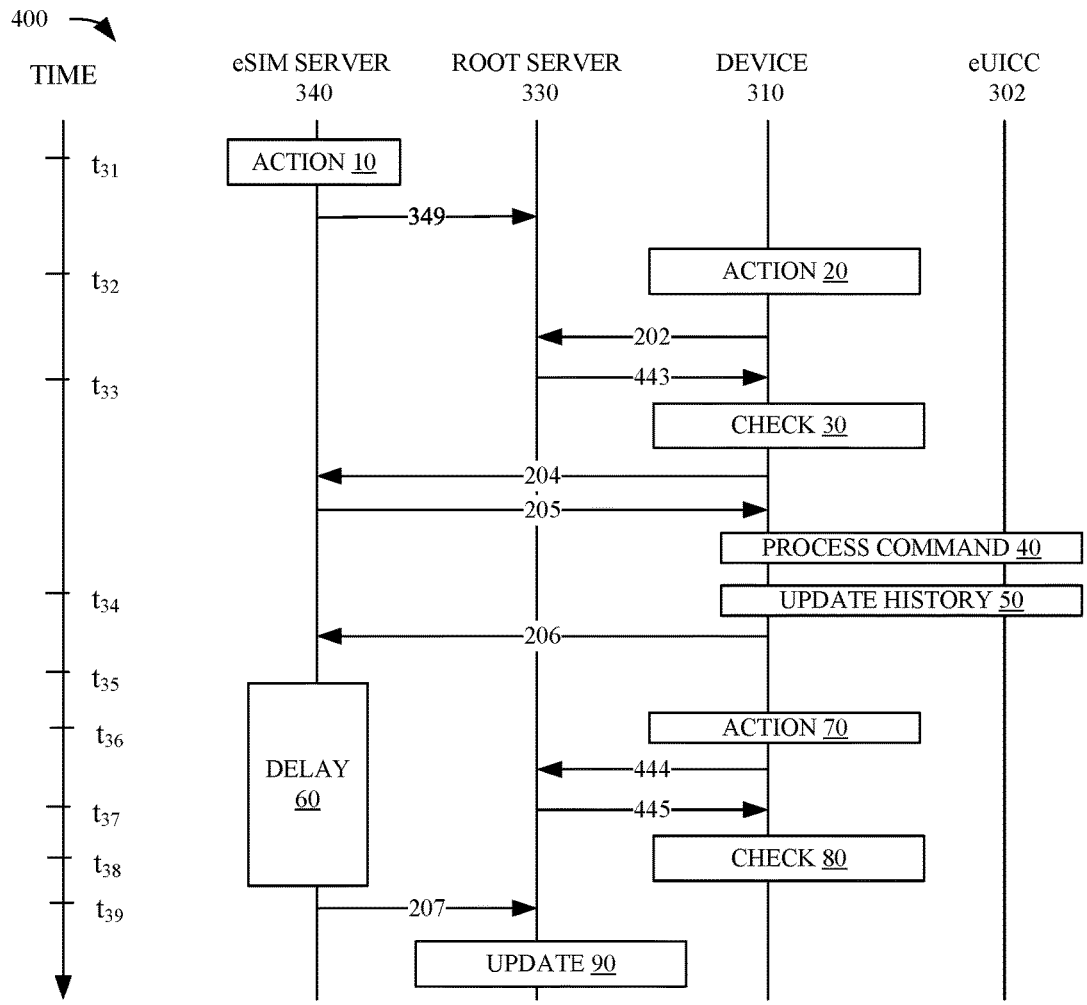
FIG. 4A illustrates an exemplary message flow related to the system of FIG. 3, according to some embodiments.
FIGS. 4B-4D represent exemplary message structures related to the messages of FIG. 4A.

FIG. 4A represents an exemplary message flow, exemplary messages, and exemplary methods according to some embodiments. At a time $t_{31}$, action 10 occurs at the eSIM server 340. The eSIM server 340 then pushes an event notification to the root server 330 using message 349. The event notification pushed by the eSIM server 340 includes, in some embodiments, one or more of a server address 410, an event type 411, an eSIM ID 412, an event ID 413, a time stamp 414, and/or a hash value 415 (discussed below with regard to FIG. 4C). At a time $t_{32}$, the device 310 initiates a request for a notification list. Action 20, in some embodiments, is triggered by a periodic maintenance schedule. Message 202 represents a request for a notification list. Message 443 represents the root server 330 providing the notification list to the device 310. The notification list, in some embodiments, includes information with a structure as shown in FIG. 4B. The root server 330, in some embodiments, appends a group hash value 404 (FIG. 4B) within the message 443. A hash function reduces data of an arbitrary size to a fixed size. A hash is not reversible, but hashes are used in applications in which two distinct data portions generally map to two different hash values. FIG. 4B illustrates data fields 401, 402, and 403, and optional group hash value 404. The number of data fields is not critical and will generally vary from one notification list to the next. Each data field conveys a notification data portion. Exemplary values in data field 401 are shown in FIG. 4C. For example, FIG. 4C illustrates exemplary values conveyed by data field 401 of the message 443: server address 410, event type 411, eSIM identifier 412, event identifier 413, a time stamp 414, and a hash value 415. In some embodiments, the event type 411, the time stamp 414, and the hash value 415 are optional in the notification data portion. For example, in some embodiments, a notification data portion does not include one or more of an event type 411, a time stamp 414 or a hash value 415.

As mentioned above, FIG. 4C represents example values in data field 401 of the message 443. FIG. 4D represents example values in the data field 402 of the message 445 (server address 420, event type 420, eSIM ID 422, event ID 423, time stamp 425 and hash value 425). These data fields are provided in the figures to illustrate how the embodiments described herein identify an already-completed event during the check 80 of FIG. 4A. As mentioned above, FIG. 4C illustrates values server address 410, event type 411, eSIM identifier 412 (labelled "eSIM ID 412" in the figure), event identifier 413 (labelled "event ID 413" in the figure), a time stamp 414, and hash value 415. The basic elements of a notification data portion are a server address, an eSIM identifier, and an event identifier. In some embodiments, one or more of the values corresponding to an event type or a hash value are also present in the notification data portion. FIG. 4C illustrates an example for the data field 401 of the message 443. The same remarks apply to FIG. 4D, other data fields and other messages provided by the root server 330 as part of a pull sequence originated by the device 310 or the eUICC 302.

At time $t_{33}$, the device 310 performs a check on, for example, the contents of the data field 401, i.e., the notification data portion conveyed by the data field 401 of the message 443. The check 30 at time $t_{33}$ determines if the event represented by the notification data portion has already been processed. The checking activity will be described further below with respect to check 80 at the time $t_{38}$. In the example of FIG. 4A, the check 30 determines that the event has not already been processed, and the event is downloaded using the sequence of messages 204 and 205. The event is then processed as shown by process command 40. After successful completion of the event, the device 310, in some embodiments, records completion in an event history, for example by creating a memory value or setting a state value indicating information about the completed event. This is indicated as update history 50 in FIG. 4A. The value written or stored to memory, in some embodiments, is a hash computed over the event type 411 and the eSIM identifier 412. The root server 130 and the device 310 use the same hash function to perform the hash operation. In some embodiments, the event type 411 is omitted from the data field and the device 310 or the eUICC 302 can compute a hash over two or more of the remaining fields from the notification data portion. The computed hash is then stored by the device 310 or the eUICC 302 in a hash history memory location in a hash history table, thus setting a state value. By this means, an event history is maintained. The device 310 (or the eUICC 302, message not shown) then sends a receipt in the message 206 to the eSIM server 340.

In some situations an unplanned delay 60 in reception of the message 207 at the root server 330 occurs from the time $t_{35}$ to the time $t_{38}$. For example, this delay can occur if the interface 141 is temporarily not functioning, i.e., the communication link carrying the message 207 on the interface 141 is temporarily down. In general, the device 310, and the eUICC 302 are unaware of the performance or status of the interface 141. The delay creates a risk of re-processing of a notification. Because the device pulls notifications from the root server 330, the device 310 relies on maintenance by the root server 330 of notifications to be processed by the device 310. A delay in root server 330 maintenance (including delay in removal of completed notifications) creates a risk of re-processing of a completed notification. The re-processing would include the server inquiry and download represented, for example, by the messages 204 and 205. Embodiments described herein, by the creation of histories of completed notifications, avoid re-processing of undeleted, previously-completed, notifications.

At time $t_{36}$, action 70 occurs at the device 310 and the device 310 seeks, using a message 444, a current notification list from the root server 130. The current notification list arrives in the message 445. eSIM server 350 also communicates with the root server 130, and new notifications originating from the eSIM server 350 may be present in any of the data fields 401 through 403, for example, for the device 310 in the current notification list.

In some instances, the notification data portion in data field 402 of the message 445 represents the same particular event as the notification data portion in the data field 401 of the message 443. This repeat of a notification in the later list can occur, for example, because of the delay 60 as explained above. The message 206 triggers the eSIM server 340 to delete the particular event information from the root server 130 (shown as update 90), but the message 207 to delete the notification corresponding to the particular event does not arrive until time $t_{39}$, after the device 310 has again pulled with message 444 a notification list in message 445 from the root server 130 at the time $t_{37}$. In some embodiments, the device 310 reads the hash value 425 and searches through the hash history table for a match with a hash value from a previously-processed event. If a hash match is found, then the device 310 can skip the notification data portion corresponding to data field 402 of message 445 and consider other notification data portions as candidates for processing. If no hash match is found, that is, only hash mis-matches are found, then the device 310 will process the notification data portion corresponding to field 402 of the message 445. In the message flow of FIG. 4A, the check 80 determines a hash match and the notification data portion corresponding to the field 402 of the message 445 is not processed. Another notification data portion is then checked (not shown in FIG. 4A), if present in the notification list that arrived in the message 445.

In some embodiments, the device 310 does not maintain a hash history table, but instead computes a hash for comparison with a received notification data portion based on an identifier of an already-installed eSIM.

Alternatively, a hash over values from the data fields 401, 402 and/or 403 is checked in some embodiments. The group hash value 404, in some embodiments, is calculated and appended by the root server 330. The device 310 and/or the eUICC 302 maintain an event history table including group hash values, in some embodiments. When the message 445 is received, the hash value 425 will match the hash value 415 of message 443 if all of the notification data portions match, in terms of the events they represent. For example, if the hash value 425 is found by the device 310 and/or the eUICC 302 in an event history table or memory, then those events corresponding to the hash value 425 have all been completed. This includes all the events represented by the message 445, in some embodiments. In some embodiments, the group hash is computed over a subset of the notification list, such as over selected values from two notification data portions. The selected values, in some embodiments, correspond to an event type and/or an eSIM identifier.

The event represented by the notification, in some embodiments, is or comprises an eSIM install event, an eSIM delete event, an eSIM enable event, and/or an eSIM disable event. In some embodiments, the events are remote profile management (RPM) commands or instructions.

In some embodiments, the history is not based on a hash value but instead based on pairs of the form (server identifier, event identifier). For example, after completing the notification data portion carried by the data field 401 of the message 443, the device stores the pair of values (server address 410, event identifier 413). After receiving the message 445, the device 310 checks the received pair (server address 420, event identifier 423) against entries in an event history table. If a match is found, the notification data portion carried by the data field 402 of the message 445 has already been completed and can be skipped. For example, in some embodiments, the device can determine a match between a current notification and a previously processed notification by using an event identifier approach. For each notification, the pair (server address or identifier, event identifier) is maintained in the event history by the device.

The event identifier is generated by the eSIM server and is part of the notification sent to the SMDS server. When the device reads a notification to be processed, it compares the current notification pair (server address, event identifier)$_{current}$ with each entry of the form (server address, event identifier)$_i$ in an event history memory or table. The subscript "i" represents an $i^{th}$ entry in the event history. If the $i^{th}$ entry in the event history, for any i, matches the pair (server address, event identifier)$_{current}$, then the notification has already been processed and is skipped. This saves device resources and avoids unnecessary network signaling.

In some embodiments, a hash value is stored in an event history table coupled with storing a pair of message fields. For example, the event history table has entries of the form (server address, event identifier, hash(event type, eSIM identifier)), in some embodiments.

The event history, in some embodiments, is stored in a first-in first-out (FIFO) buffer in the eUICC 302.

In some embodiments, the notification data portion includes a time stamp. For example, FIGS. 4C and 4D illustrate time stamps 414 and 424. The event identifier (for example, event identifier 413) can be used in conjunction with time stamp information to differentiate the same type of command sent at a different time. For example, the events or commands to differentiate could be "enable eSIM with identifier ICCID1 at day 1", "enable eSIM with identifier ICCID1 at day 2". That is the command and the target eSIM are the same, but the time stamps are different. These are not the same event, and each would be processed by the device 310. The check 30 and the check 80 actions, in some embodiments, distinguish these events based on the time stamp information. In some embodiments, the time stamp information is part of the notification data portion and the event identifier is not present in the notification data portion. Uniqueness of the indicated events is provided in conjunction with the associated server address. In some embodiments, the server address is represented by a server name.

Event History Logic

Figure 5:
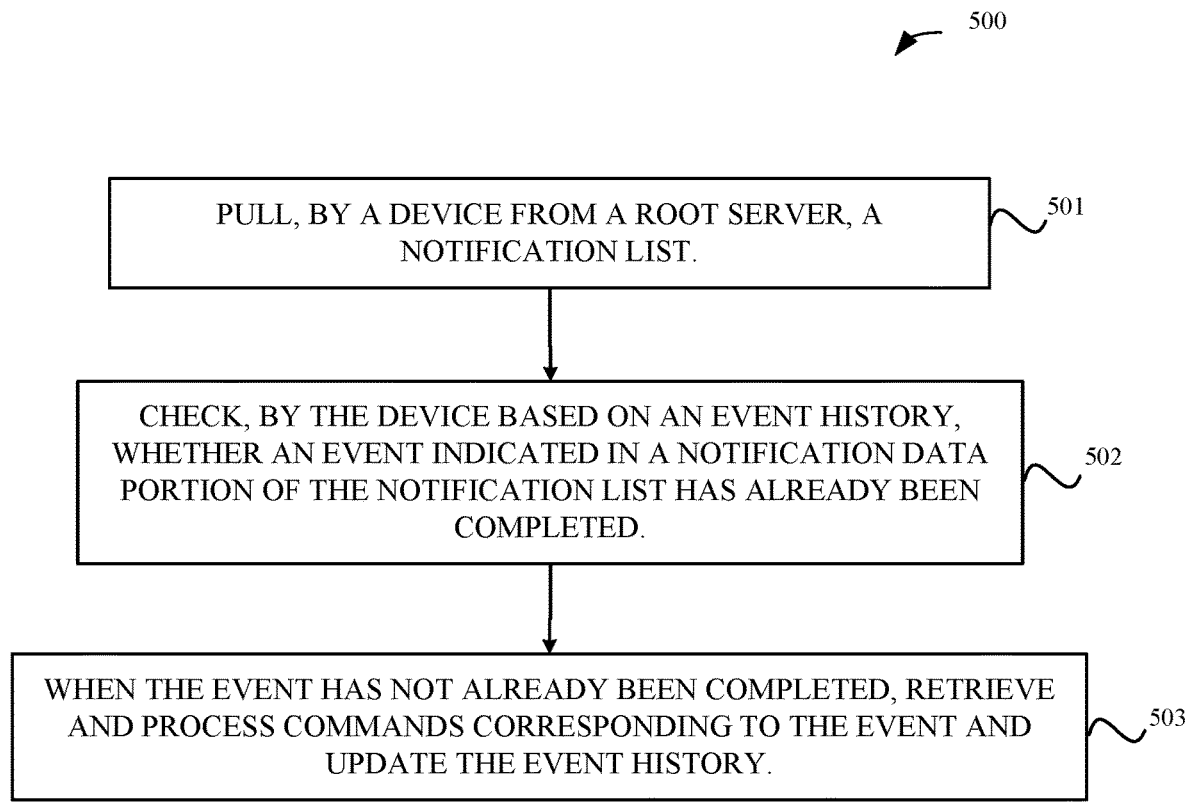
FIG. 5 illustrates exemplary logic for checking a notification using an event history, according to some embodiments.

FIG. 5 provides exemplary logic 500 for robust handling of an eSIM notification service. At 501, a device pulls from a root server, a notification list. At 502, the device checks, based on an event or command history, whether one or more events indicated in a notification data portion of the notification list have already been successfully completed. At 503, if an event or command from the notification list has not already been completed, the device retrieves the event or command, processes the event or command and then updates the event history.

An Example Device Method

In some embodiments, a device requests a first notification list, and receives the first notification list, wherein the first notification list comprises a first notification data portion. The first notification data portion comprises: i) an address of a first eSIM server, ii) a first event type value, iii) a first eSIM identifier, and iv) a first hash value. The device then retrieves a first command using the address of the first eSIM server, and processes the first command to produce a completion result. When the completion result indicates that the processing is successful, the first device saves the first hash value in a hash history memory location, and sends a receipt to the first eSIM server.

In some embodiments, the device also requests a second notification list, and receives the second notification list. The second notification list comprises a second notification data portion, and the second notification data portion comprises: i) an address of a second eSIM server, ii) a second event type value, iii) a second eSIM identifier, and iv) a second hash value. The device then checks the second notification data portion for a prior completion to produce a checking result. When the checking result indicates that the second notification data portion has already been processed, the device reads a third notification data portion from the second notification list. When the checking result does not indicate that the second notification data portion has already been processed, the device retrieves a second command using the address of the second eSIM server. In some embodiments, the device checks the second notification data portion for a prior completion by reading a stored hash value from the hash history memory location, and comparing the second hash value to the stored hash value to produce a hash comparison result. When the hash comparison result indicates a hash match, the device sets the checking result to indicate that the second notification data portion has already been processed. When the hash result indicates a hash mismatch, the device sets the checking result to indicate that the second notification data portion has not already been processed.

Another Example Device Method

In some embodiments, a device requests a notification list, receives the notification list and checks a group hash value. The notification list comprises i) a first notification data portion, ii) a second notification data portion, and iii) a group hash value, and wherein the first notification data portion comprises: i) an address of a first electronic subscriber identity module (eSIM) server, ii) a first event type value, iii) a first eSIM identifier, and iv) a first hash value. The device checks the group hash value to determine whether the first and second data notification portions have already been processed. When the device finds that the first and second notifications have not already been processed, the device retrieves a first command using the address of the first eSIM server, and process the first command to produce a completion result. When the completion result indicates that the processing is successful, the device saves the first hash value in a hash history memory location, and sends a receipt to the first eSIM server.

Figure 6:
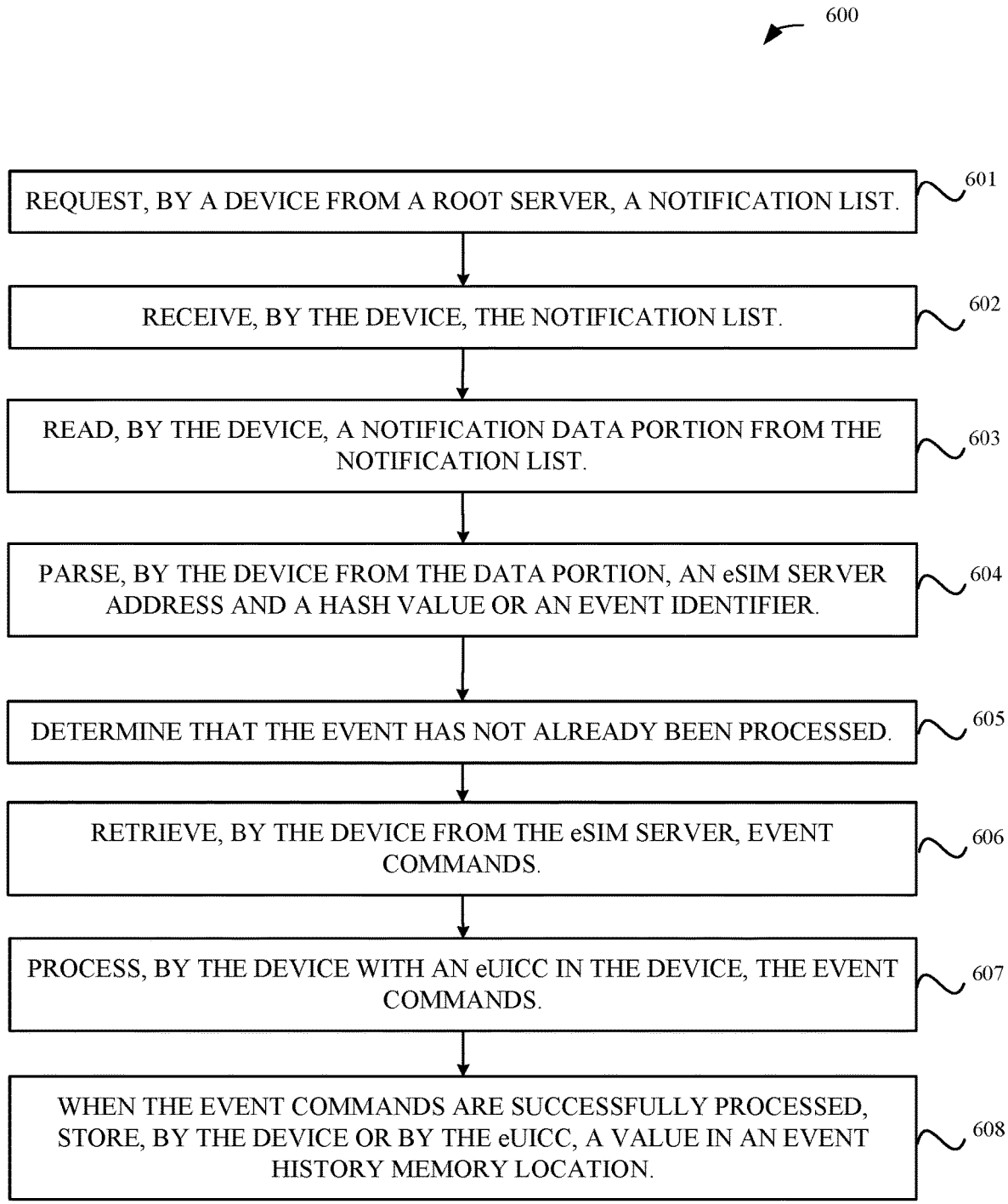
FIG. 6 illustrates exemplary logic for recording, in a hash history, successful completion of an event, according to some embodiments.

FIG. 6 illustrates exemplary logic 600 for establishing state information or a history of completed events or commands related to an eSIM notification service. At 601, a device requests a notification list from a root server. At 602, the device receives a list. 601 and 602 together represent a pull by the device from the root server. At 603, the device reads a notification data portion form the notification list. At 604, the device parses from the notification data portion an eSIM server address and a hash value or an event identifier. The device checks if the event corresponding to the notification data portion has already been completed. This check is shown at 605. This check is based in some embodiments on seeking a matching hash value in a hash history table. In some embodiments, the check is based on seeking a match to the pair of values comprising the server identifier and the event identifier. In this particular example, processing of event commands has not already been completed and the particular outcome causes the logic to flow to 606. In the alternative of prior completion, the logic would flow back, for example, to 601 at some point in time to again fetch a notification list.

In the example of FIG. 6, at 606, the device retrieves the event commands from the eSIM server reached by the eSIM server address. At 607, the device processes the event commands. In general, processing event commands may be referred to herein as processing an event. There may be a single event command or more than one event command. At 608, after a successful completion of the event commands, the device or the eUICC updates a history table, in some embodiments. The history table, in some embodiments, is a table of hash values. In some embodiments, the state or history is maintained by storing the hash value in a hash history memory location in the history table.

Notification Processing with Priority

Figure 7:
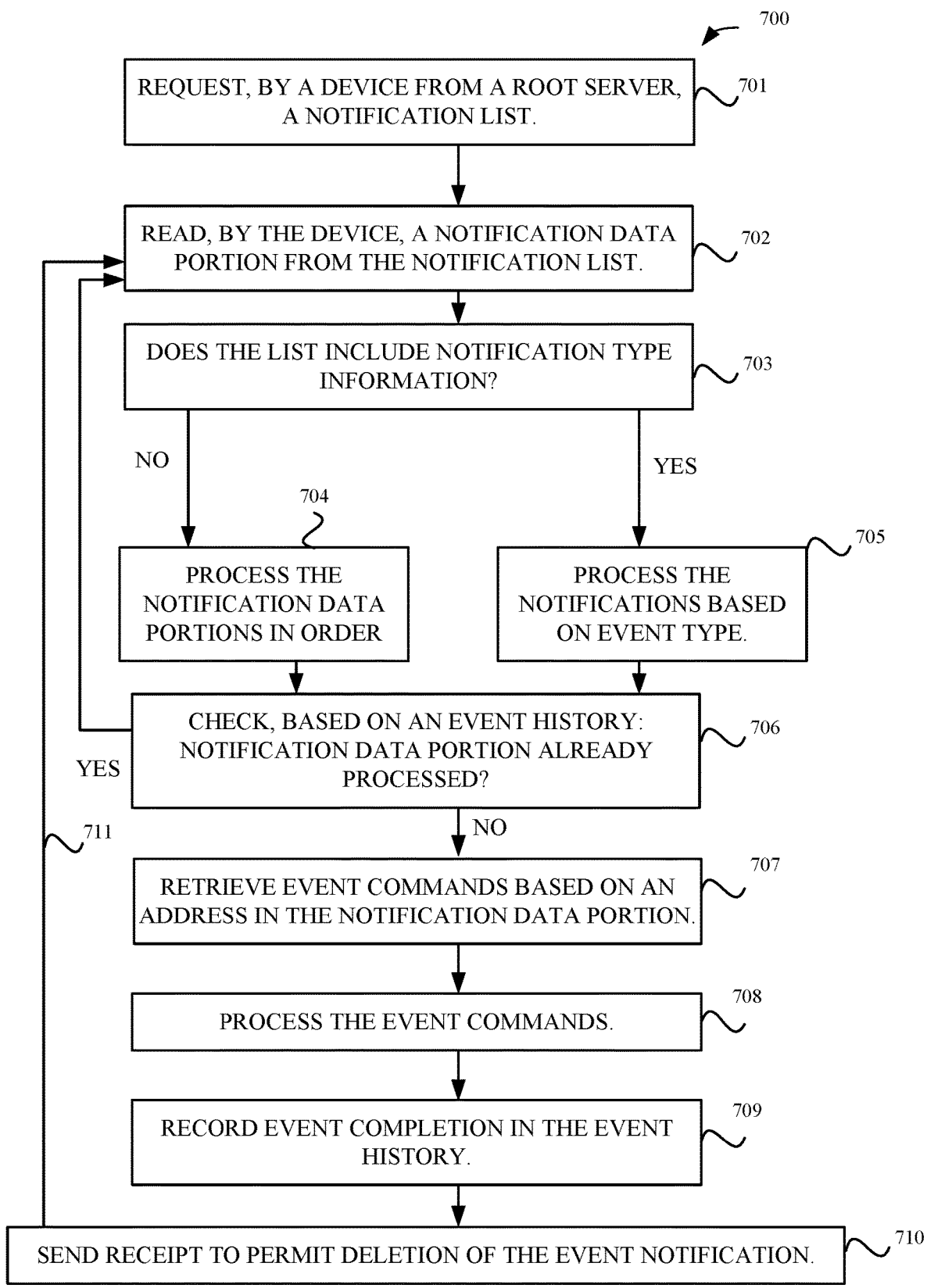
FIG. 7 illustrates exemplary logic for prioritizing the handling of events from a notification list and checking, based on an event history, whether a given event has already been processed, according to some embodiments.

FIG. 7 provides exemplary logic for processing notifications, including processing notifications out of order depending on a notification type. An instance of a notification type, for example, can be represented by the event type (value) 411 of FIG. 4C. One example of an event type value is a profile (eSIM) installation triggered by the end user 320. Another event type is a profile (eSIM) deletion. End user events will generally be prioritized for completion before maintenance events such as profile deletion. At 701, a device requests a notification list. At 702, the device reads a notification data portion from the notification list. 703 represents a decision point. If notification type information is present in the notification list, then the notifications will be re-ordered according to event type. For example, the next notification processed is one having a priority. The selection of the high priority notification is done at 705 (this may involve a re-visit to 702, not shown). If notification type information is not present, the notifications are processed in the order that the notifications appear in the list. This list-ordered notification selection is done at 704. For a given notification to be processed, a check is performed at 706 to see if the notification has already been processed. The check, in some embodiments, is based on an event history. If the notification has already been processed, then the logic seeks a next notification to process by flowing to 702 again. If the notification has not yet been processed, the logic flows to 707. The details of the event, such as event commands, are then retrieved from a server at 707 based on an address recovered from the notification data portion. The event commands are then processed at 708. At 709, successful completion of the event is memorialized in an event history, in some embodiments. The event history, in some embodiments, is one or more of a hash value, or a (server address or identifier, event identifier) pair. At 710, receipt of completion is sent to the server associated with the server address. The logic flows to 702 to obtain a next notification data portion, if all notification data portions have not yet been read from the list.

Figure 8:
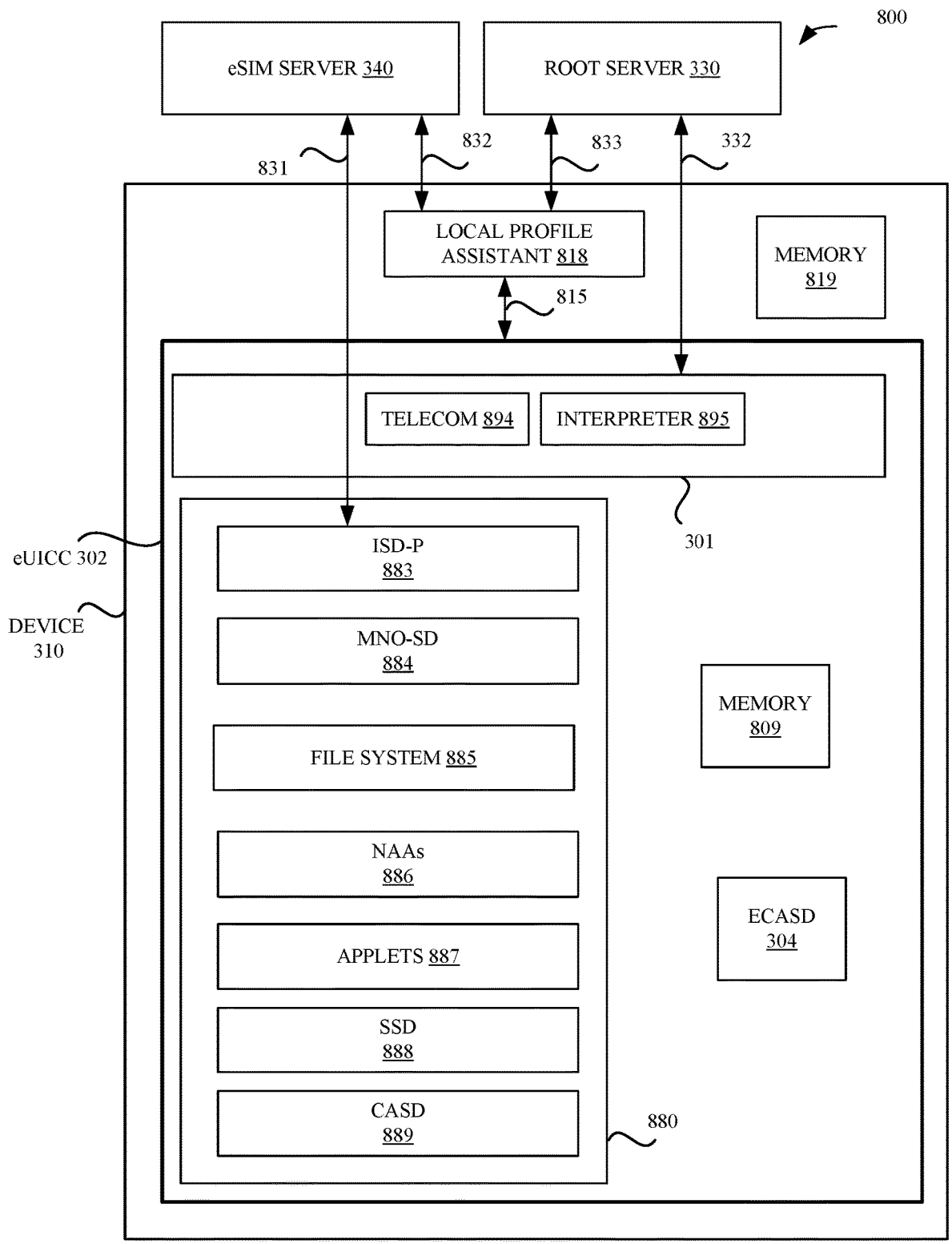
FIG. 8 illustrates further details of the eUICC and device of the exemplary system of FIG. 3, according to some embodiments.

FIG. 8 illustrates further details of the eUICC 302 in a system 800. The eUICC 302 includes an operating system 301. Within the operating system 301 is a telecom framework 894 which provides authentication algorithms to network access applications (such as NAAs 886). Interpreter 895 translates profile package data into an installed profile using a specific internal format of the eUICC 302. ISD-P 883 hosts a profile 880. An event processed by the device 310 with the eUICC 302 can include, for example, installing, enabling, or disabling of the eSIM (profile) 880.

The ISD-P is a secure container (security domain) for the hosting of the profile 880. The ISD-P is used for profile download and installation in collaboration with the interpreter 895 for the decoding of a received bound profile package. ECASD 304 provides secure storage of credentials required to support the security domains on eUICC 302. MNO-SD 884 is the representative on the eUICC 302 of an operator providing services to the end user 320. The MNO-SD 884 contains the operator's OTA keys and provides a secure OTA channel. Further description of profile management in a consumer device can be found in SGP.21.

The event history described herein, in some embodiments, is stored in device 310 memory 819 and/or eUICC 302 memory 809.

The eSIM server 340 and the root server 330 communicate with the device 310, in some embodiments, on interfaces 832 and 833, respectively, via the local profile assistant 818. The local profile assistant communicates with the eUICC 302 via the interface 815. The eSIM server 340 also communicates with the profile (eSIM) 880 directly on the interface 831. The root server 330, in some embodiments, communicates with the device 310 OS 301 on an interface 332.

Figure 9:
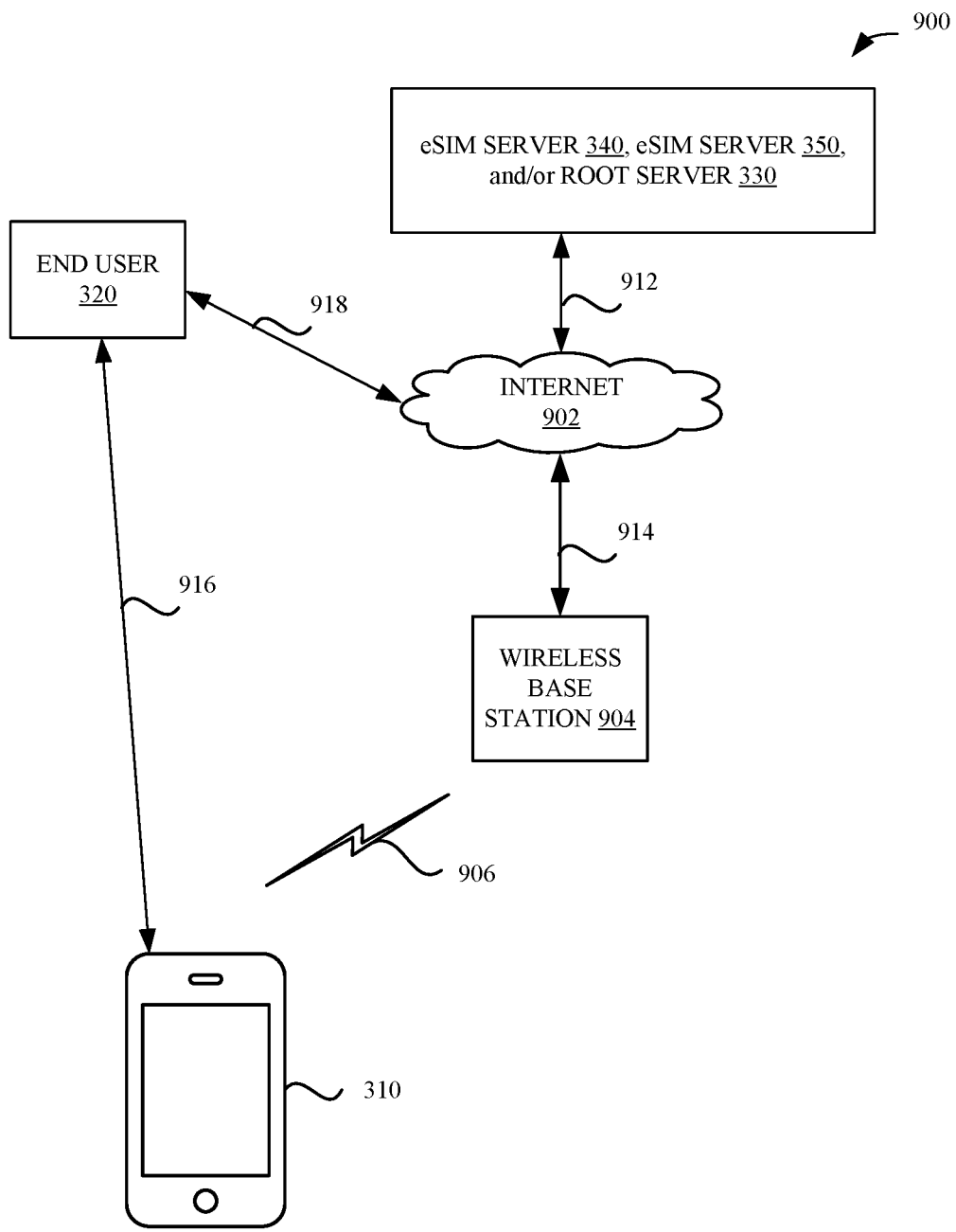
FIG. 9 illustrates exemplary interconnections of the system of FIG. 3, according to some embodiments.

FIG. 9 illustrates example connection methods for remote and local management of the device 310 in a system 900. End user 320 can locally manage device 310 using interface 916 which can represent end user actions. The end user 320 can also remotely manage device 310 via the Internet 902 using interface 918. The device 310 is shown connected to a wireless base station 904. The wireless base station 904 communicates with the device 310 via a wireless link 906. The wireless base station 904 can be an Institute of Electronic and Electrical Engineers 802.11 Wireless Fidelity (IEEE 802.11 Wi-Fi) access point (AP) or the wireless base station 904 can be, for example, a cellular mobile network base station. Examples of cellular mobile network base stations are a 2G or 3G base station or an LTE eNode B. The device 310 can also connect to the Internet 902 via a wired connection (not shown).

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative Exemplary Apparatus

Figure 10:
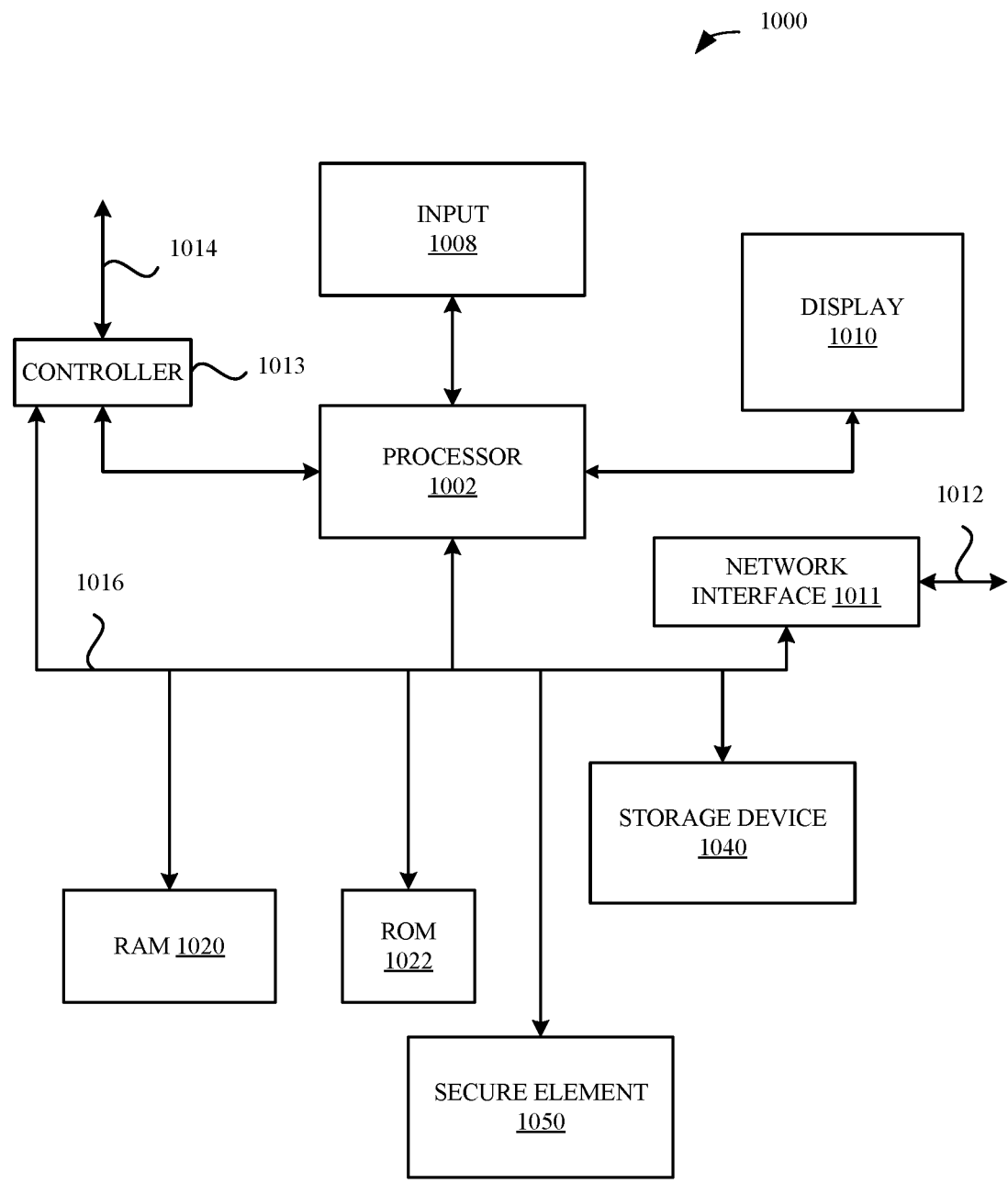
FIG. 10 illustrates an exemplary apparatus for implementation of the embodiments disclosed herein.

FIG. 10 illustrates in block diagram format an exemplary computing device 1000 that can be used to implement the various components and techniques described herein, according to some embodiments. In particular, the detailed view of the exemplary computing device 1000 illustrates various components that can be included in the device 310, the eUICC 302, the root server 330, and the eSIM server 340 illustrated in FIGS. 3, 8 and 9. As shown in FIG. 10, the computing device 1000 can include a processor 1002 that represents a microprocessor or controller for controlling the overall operation of computing device 1000. The computing device 1000 can also include a user input device 1008 that allows a user of the computing device 1000 to interact with the computing device 1000. For example, the user input device 1008 can take a variety of forms, such as a button, keypad, dial, touch screen, audio input interface, visual/image capture input interface, input in the form of sensor data, etc. Still further, the computing device 1000 can include a display 1010 (screen display) that can be controlled by the processor 1002 to display information to the user (for example, information relating to incoming, outgoing, or active communication session). A data bus 1016 can facilitate data transfer between at least a storage device 1040, the processor 1002, and a controller 1013. The controller 1013 can be used to interface with and control different equipment through an equipment control bus 1014. The computing device 1000 can also include a network/bus interface 1011 that couples to a data link 1012. In the case of a wireless connection, the network/bus interface 1011 can include wireless circuitry, such as a wireless transceiver and/or baseband processor.

The computing device 1000 also includes the storage device 1040, which can comprise a single storage or a plurality of storages (e.g., hard drives), and includes a storage management module that manages one or more partitions within the storage device 1040. In some embodiments, storage device 1040 can include flash memory, semiconductor (solid state) memory or the like. The computing device 1000 can also include a Random Access Memory ("RAM") 1020 and a Read-Only Memory ("ROM") 1022. The ROM 1022 can store programs, utilities or processes to be executed in a non-volatile manner. The RAM 1020 can provide volatile data storage, and stores instructions related to the operation of the computing device 1000. The computing device 1000 also includes a secure element 1050. In some embodiments, the secure element 1050 is an eUICC.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method implemented by a wireless device, the method comprising:
   receiving, from a root server, a notification list, wherein the notification list comprises (1) an indication of an electronic Subscriber Identity Module (eSIM server), and (2) a hash value associated with the notification list;
   determining, based on the hash value and a plurality of hash values corresponding to previously-processed event commands, whether an event command associated with the notification list has been previously-processed by the wireless device; and
   in response to determining that the event command has not been previously-processed by the wireless device:
      retrieving the event command from the eSIM server based on the notification list,
      processing the event command,
         adding the hash value to the plurality of hash values corresponding to the previously-processed event commands, and
      sending a receipt to the eSIM server.

2. The method of claim 1, wherein the root server receives the notification list from the eSIM server.

3. The method of claim 1, wherein the eSIM server, in conjunction with processing the receipt, causes the root server to delete the notification list.

4. The method of claim 1, wherein the receipt is not received by the eSIM server or the eSIM server is unable to case the root server to delete the notification list.

5. The method of claim 1, wherein the event command comprises an eSIM install command, an eSIM delete command, an eSIM enable command, or an eSIM disable command.

6. The method of claim 1, further comprising, in response to determining that the event command has been previously-processed by the wireless device:
   disregarding the event command.

7. The method of claim 1, wherein the hash value is calculated by the eSIM server or the root server.

8. At least one non-transitory computer readable storage medium configured to store instructions that, when executed by at least one processor included in a wireless device, cause the wireless device to carry out steps that include:
   receiving, from a root server, a notification list, wherein the notification list comprises, (1) an indication of an electronic Subscriber Identity Module (eSIM server), and (2) a hash value associated with the notification list;
   determining, based on the hash value and a plurality of hash values corresponding to previously-processed event commands, whether an event command associated with the notification list has been previously-processed by the wireless device; and
   in response to determining that the event command has not been previously-processed by the wireless device:
      retrieving the event command from the eSIM server based on the notification list,
      processing the event command, adding the hash value to the plurality of hash values corresponding to the previously-processed event commands, and sending a receipt to the eSIM server.

9. The at least one non-transitory computer readable storage medium of claim 8, wherein the root server receives the notification list from the eSIM server.

10. The at least one non-transitory computer readable storage medium of claim 8, wherein the eSIM server, in conjunction with processing the receipt, causes the root server to delete the notification list.

11. The at least one non-transitory computer readable storage medium of claim 8, wherein the receipt is not received by the eSIM server or the eSIM server is unable to case the root server to delete the notification list.

12. The at least one non-transitory computer readable storage medium of claim 8, wherein the event command comprises an eSIM install command, an eSIM delete command, an eSIM enable command, or an eSIM disable command.

13. The at least one non-transitory computer readable storage medium of claim 8, wherein the steps further include, in response to determining that the event command has been previously-processed by the wireless device:

disregarding the event command.

14. The at least one non-transitory computer readable storage medium of claim 8, wherein the hash value is calculated by the eSIM server or the root server.

15. A wireless device, comprising:

at least one processor; and at least one memory storing instructions that, when executed by the at least one processor, cause the wireless device to perform steps that include:

receiving, from a root server, a notification list, wherein the notification list comprises (1) an indication of an electronic Subscriber Identity Module (eSIM server), and (2) a hash value associated with the notification list;

determining, based on the hash value and a plurality of hash values corresponding to previously-processed event commands, whether an event command associated with the notification list has been previously-processed by the wireless device; and in response to determining that the event command has not been previously-processed by the wireless device:

retrieving the event command from the eSIM server based on the notification list, processing the event command, adding the hash value to the plurality of hash values corresponding to the previously-processed event commands, and sending a receipt to the eSIM server.

16. The wireless device of claim 15, wherein the root server receives the notification list from the eSIM server.

17. The wireless device of claim 15, wherein the eSIM server, in conjunction with processing the receipt, causes the root server to delete the notification list.

18. The wireless device of claim 15, wherein the receipt is not received by the eSIM server or the eSIM server is unable to case the root server to delete the notification list.

19. The wireless device of claim 15, wherein the event command comprises an eSIM install command, an eSIM delete command, an eSIM enable command, or an eSIM disable command.

20. The wireless device of claim 15, wherein the at least one processor further causes the wireless device to perform steps that include, in response to determining that the event command has been previously-processed by the wireless device:

disregarding the event command.

* * * * *